United States Patent
Ye et al.

(10) Patent No.: US 10,830,241 B2
(45) Date of Patent: Nov. 10, 2020

(54) PERMANENT MAGNET PUMP

(71) Applicant: Baker Hughes, Houston, TX (US)

(72) Inventors: Zheng Ye, Claremore, OK (US); Ameen Muhammed, Broken Arrow, OK (US); Carroll Dearman, Owasso, OK (US); Nikolas Davis, Broken Arrow, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 361 days.

(21) Appl. No.: 15/954,719

(22) Filed: Apr. 17, 2018

(65) Prior Publication Data

US 2019/0040862 A1    Feb. 7, 2019

Related U.S. Application Data

(60) Provisional application No. 62/539,870, filed on Aug. 1, 2017.

(51) Int. Cl.
  *F04D 13/06*  (2006.01)
  *F04D 29/44*  (2006.01)
  (Continued)

(52) U.S. Cl.
  CPC .............. *F04D 13/06* (2013.01); *F04D 1/06* (2013.01); *F04D 1/08* (2013.01); *F04D 13/08* (2013.01);
  (Continued)

(58) Field of Classification Search
  CPC . F04D 3/00; F04D 13/06; F04D 13/08; F04D 13/086; F04D 13/10; F04D 1/08;
  (Continued)

(56) References Cited

U.S. PATENT DOCUMENTS 5,649,811 A * 7/1997 Krol, Jr. .............. F04D 13/0646
                                                      417/353
5,713,727 A    2/1998 Veronesi et al.
                      (Continued)

FOREIGN PATENT DOCUMENTS

CN     203978856 U    12/2014
GB       2499114 A     8/2013
                   (Continued)

OTHER PUBLICATIONS

International Search Report dated and Written Opinion dated Sep. 14, 2018 for corresponding PCT/US2018/034641.
International Search Report and Written Opinion dated Sep. 4, 2018 for corresponding PCT/US2018/034702.

*Primary Examiner* — Bryan M Lettman
(74) *Attorney, Agent, or Firm* — Bracewell LLP; James E. Bradley

(57) ABSTRACT

A combined well pump and motor includes a housing having an axis, an upstream end and a downstream end. Diffusers are mounted for non-rotation in the housing, each of the diffusers having diffuser passages. An impeller is mounted between each of the diffusers for rotation relative to the impellers. Each of the impellers has impeller vanes defining impeller passages. The impeller has an exterior outer wall extending circumferentially around the impeller vanes, closing outer sides of each of the impeller passages. An array of magnets is mounted to each of the impellers. The magnets are spaced circumferentially apart from each other around the axis at a different radial distance from the axis than the impeller vanes. A stator is mounted in the housing. The stator has windings for interacting with the magnets to impart rotation to the impellers.

19 Claims, 2 Drawing Sheets

(51) Int. Cl.
*F04D 29/22* (2006.01)
*F04D 1/06* (2006.01)
*F04D 13/10* (2006.01)
*F04D 29/18* (2006.01)
*F04D 29/40* (2006.01)
*F04D 29/42* (2006.01)
*F04D 1/08* (2006.01)
*F04D 25/06* (2006.01)
*F04D 13/08* (2006.01)

(52) U.S. Cl.
CPC ........... *F04D 13/086* (2013.01); *F04D 13/10* (2013.01); *F04D 25/0686* (2013.01); *F04D 29/181* (2013.01); *F04D 29/183* (2013.01); *F04D 29/186* (2013.01); *F04D 29/22* (2013.01); *F04D 29/406* (2013.01); *F04D 29/426* (2013.01); *F04D 29/44* (2013.01); *F04D 29/445* (2013.01)

(58) Field of Classification Search
CPC ........ F04D 1/06; F04D 25/06; F04D 25/0606; F04D 25/0686; F04D 29/181; F04D 29/183; F04D 29/186; F04D 29/22; F04D 29/406; F04D 29/42; F04D 29/426; F04D 29/44; F04D 29/445; F04D 29/448
See application file for complete search history.

(56) References Cited

U.S. PATENT DOCUMENTS

| | | |
|---|---|---|
| 5,921,484 A | 7/1999 | Smith et al. |
| 6,056,518 A | 5/2000 | Allen et al. |
| 6,499,966 B1 | 12/2002 | Werson et al. |
| 6,554,584 B2 | 4/2003 | Takura et al. |
| 6,811,382 B2 | 11/2004 | Buchanan et al. |
| 7,021,905 B2 | 4/2006 | Torrey et al. |
| 2006/0056992 A1* | 3/2006 | Sadler ................... F04D 29/426 417/321 |
| 2012/0063934 A1 | 3/2012 | Rumbaugh et al. |
| 2013/0236341 A1 | 9/2013 | Norali |
| 2014/0079575 A1* | 3/2014 | Forsberg ............... F04D 29/041 417/423.3 |
| 2014/0112808 A1 | 4/2014 | Moore |
| 2015/0132159 A1* | 5/2015 | Wilson .................... E21B 47/06 417/410.1 |
| 2015/0167686 A1 | 6/2015 | Baillargeon et al. |
| 2016/0090992 A1* | 3/2016 | Jayaram ................ E21B 43/128 415/144 |

FOREIGN PATENT DOCUMENTS

| | | | |
|---|---|---|---|
| WO | 2017021553 A1 | | 2/2017 |
| WO | WO2017021553 | * | 2/2017 |
| WO | 2018022198 A1 | | 2/2018 |
| WO | WO2018022198 | * | 2/2018 |

* cited by examiner

PERMANENT MAGNET PUMP

CROSS REFERENCE TO RELATED APPLICATION

This application claims priority to Ser. No. 62/539,870, filed Aug. 1, 2017.

FIELD OF DISCLOSURE

The present disclosure relates to downhole pumping systems for well bore fluids. More specifically, the present disclosure relates to a centrifugal pump with magnets mounted to the impellers that cause the impellers to rotate in response to electromagnetic fields emanating from a stator.

BACKGROUND

Electrical submersible pumps (ESP) are commonly used in hydrocarbon producing wells. A typical ESP includes an electrical motor having a rotating drive shaft that drives the pump. The pump is often a centrifugal pump having a large number of stages. Each stage has a nonrotating diffuser and a rotating impeller. The motor has a drive shaft that couples to the pump shaft to rotate the impellers. The motor may have lengths up to 30 feet or more. Radial motor bearings support the motor shaft along the length. A dielectric fluid in the motor lubricates the motor bearings. A pressure equalizer mounts to the motor to reduce a pressure difference between the dielectric lubricant in the motor and the well fluid on the exterior. A shaft seal, usually at an end of the pressure equalizer, seals around the drive shaft to prevent the entry of well fluids into the motor lubricant.

In some cases, pumps are mounted in tandem and motors are mounted in tandem, creating a lengthy assembly. A workover rig is often required to install and retrieve the assembly. The motor relies on well fluid flowing past to cool the motor. Consequently, some arrangements must be made to achieve well fluid flow. For example, the motor may be positioned above the casing perforations or a shroud surrounding the motor may be deployed. Alternately, a small tube may extend alongside the motor from the pump to below the motor to divert a portion of the well fluid being pumped by the pump.

While very successful, ESP's have many parts, adding cost and reliability issues. The shaft seal creates a leakage path for well fluid, which can cause motor failure. The long length can create problems in installing the pump within curved sections of a deviated well.

SUMMARY

A combined pump and motor apparatus comprises a housing having an axis, an upstream end and a downstream end. Diffusers are mounted for non-rotation in the housing. Each of the diffusers has diffuser passages. An impeller rotatably mounts between each of the diffusers. Each of the impellers has impeller vanes defining impeller passages between adjacent ones of the impeller vanes. The impeller has an exterior outer wall extending circumferentially around the impeller vanes, closing outer sides of each of the impeller passages. An array of magnets is mounted to each of the impellers. The magnets are spaced circumferentially apart from each other around the axis at a different radial distance from the axis than the impeller vanes. A stator is non rotatably mounted in the housing. The stator has windings for interacting with the magnets to impart rotation to the impellers.

In the embodiment shown, each of the impellers has an upstream end with a cylindrical skirt and a downstream end with a cylindrical balance ring. Each of the diffusers has a downstream end with a cylindrical skirt wall that is slidingly engaged by the skirt of a downstream one of the impellers. Each of the diffusers has an upstream end with a cylindrical balance ring wall that is slidingly engaged by the balance ring of an upstream one of the impellers. A balance hole may extend through each of the impeller passages to a balance ring cavity to divert a portion of the fluid flowing through the impeller passages to the balance ring cavity.

In the embodiment shown, stacked stator discs of a steel alloy are grouped in stator sections. Each of the stator sections is radially spaced from the magnets of one of the impellers. Spacer members are positioned between each of the stator sections and radially spaced from the diffusers. The spacer members may be formed of a nonmagnetic material. The spacer members may also be discs stacked together.

The diffusers may be mounted in a central axial cavity of the stator. A diffuser outer seal may be employed to seal between the exterior of each of the diffusers and the cylindrical wall of the stator cavity.

The windings within the stator extend through slots that are sealed from fluid flowing through the impeller passages and the diffuser passages. Each of the slots in the stator may be filled with an epoxy encapsulating the windings therein. A nonmagnetic sleeve may be installed within the central apertures of the stator discs to seal the windings. If employed, the cylindrical wall of the stator cavity comprises the nonmagnetic sleeve.

In the embodiment shown, a cylindrical exterior wall on each of the impellers surrounds outer sides of the magnets of each of the impellers. Each of the magnets may have an axial dimension that differs from an axial dimension of each of the impeller passages.

A conical nose on each of the impellers is concentric with the axis. Each of the noses rotates with the impeller and faces in an upstream direction.

Figure 1:
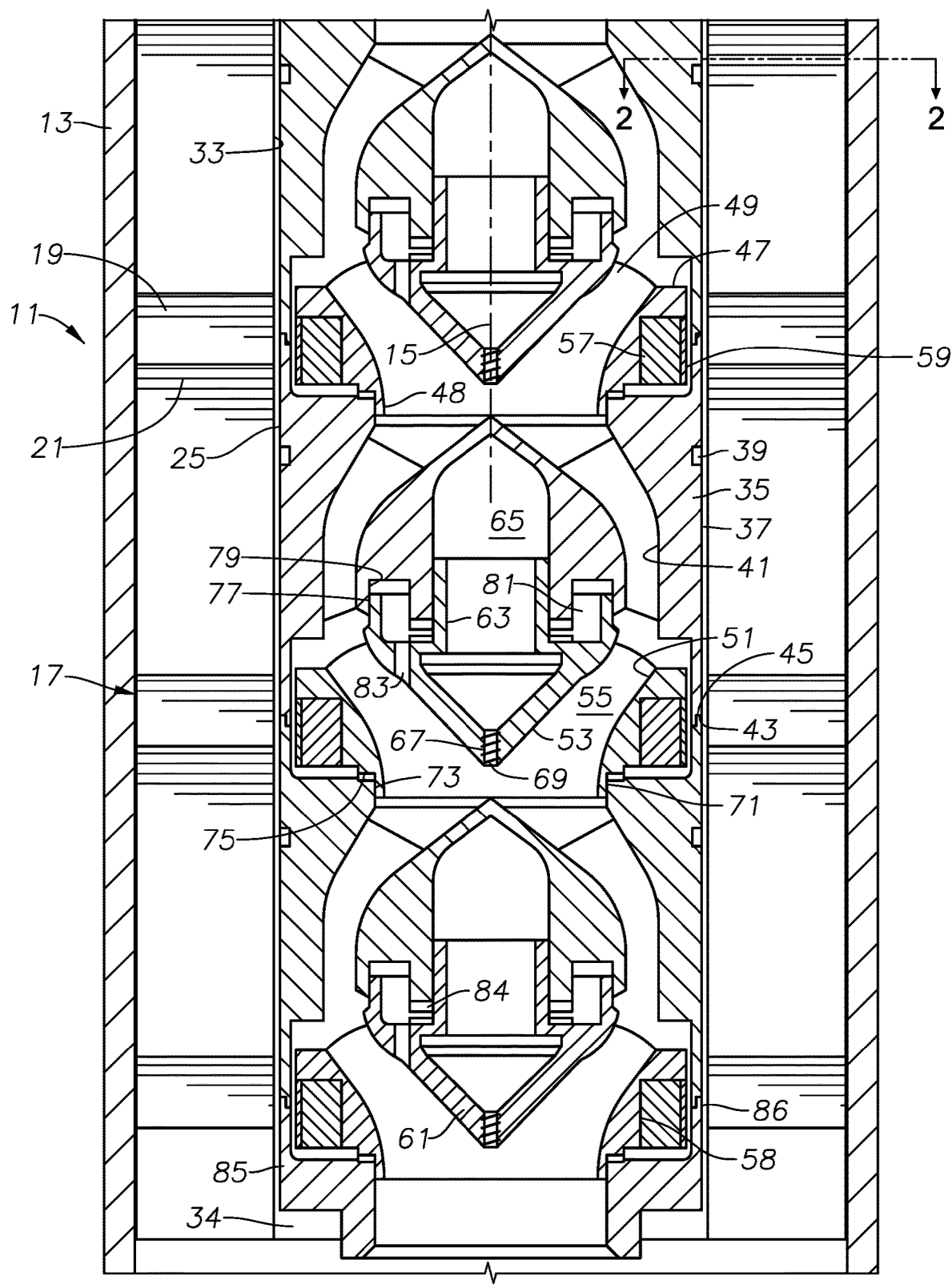
FIG. 1 is a sectional view of portions of a combined pump and motor in accordance with this disclosure.

While the disclosure will be described in connection with the preferred embodiments, it will be understood that it is not intended to limit the disclosure to that embodiment. On the contrary, it is intended to cover all alternatives, modifications, and equivalents, as may be included within the scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Portions of a combined pump and motor 11 are shown in FIG. 1. Pump and motor 11 has a cylindrical housing 13 with a longitudinal axis 15. A stator 17 is mounted stationarily in housing 13. In this embodiment, stator 17 closely fits within the inner diameter of housing 13. Stator 17 is made up of a large number of thin, metal discs or laminations 19, 21 stacked together. In this embodiment, discs 19, 21 include groups or sections of stator discs 19, which are made from a magnetic material such as a type of a steel alloy. The sections of stator discs 19 are separated from each other by groups or sections of spacer discs 21. Spacer discs 21 are formed of a nonmagnetic material, such as nonmagnetic stainless steel or bronze alloy. Otherwise, stator discs 19 and spacer discs 21 may be identical.

Figure 2:
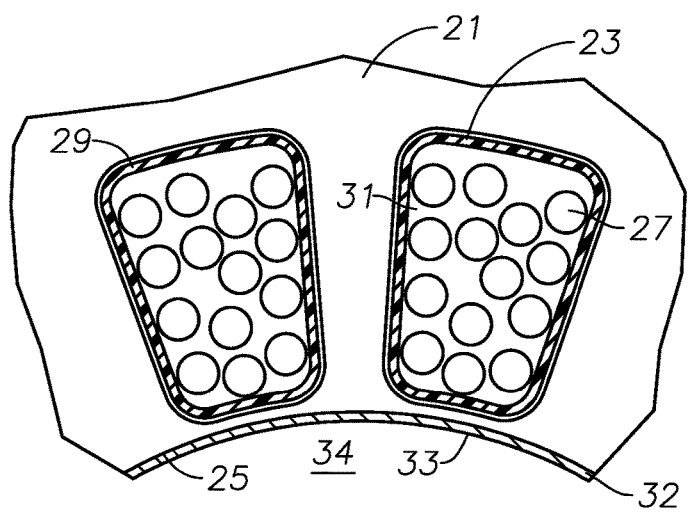
FIG. 2 is a sectional view of the stator of the pump and motor of FIG. 1, taken along the line 2-2 of FIG. 1.

Referring to FIG. 2, a top view of a portion of one of the spacer discs 21 is illustrated; stator discs 19 are identical except for the type of material. Each disc 19, 21 has a plurality of slots 23 spaced circumferentially apart from each other around a large central aperture 25. Optionally, parts of the inner edges of slots 23 could be open and join central aperture 25. Alternately, slots 23 could be closed and separated from central aperture 25 by bridges. Slots 23 of discs 19, 21 are axially aligned with each other in axial rows. Motor windings 27, which are insulated conductors, wind through the various slots 23 generally parallel with axis 15 (FIG. 1). Each row of axially aligned slots 23 may have a thermoplastic liner 29 through which windings 27 extend. Also, windings 27 may be imbedded in a bonding material, such as epoxy 31, which is injected into liners 29 after windings 27 have been wound through slots 23.

Windings 27 extend continuously through slots 23 from the upper end to the lower end of stator 17. Windings 27 in one axial row of slots 23 pass from the lower end into another axial row in a selected pattern. A winding 27 for each phase extends from one end of stator 17, such as the upper end, for receiving AC current. When supplied with three phase AC power, windings 27 create electromagnetic fields directed inward toward axis 15. The terms "upper", "lower" and the like are used for convenience only because the combined pump and motor 11 (FIG. 1) may be used in various inclinations, including horizontal, as well as inverted.

Central apertures 25 of stator and spacer discs 19, 21 have the same diameter, creating a cylindrical inward facing stator wall 33 of constant inner diameter. Stator wall 33 defines a central cylindrical stator cavity 34 that is coaxial with axis 15. A thin nonmagnetic can or sleeve 32 optionally may be installed within central apertures 25 of stator 17. If employed, stator wall 33 will comprise the inner diameter of sleeve 32. The outer diameter of sleeve 32 seals to central apertures 27 at the top and bottom of stator 17 to prevent well fluid in stator cavity 34 from contact with stator discs 19 and windings 27 (FIG. 2). Epoxy 31 (FIG. 2) may optionally be disposed in in slots 23 to seal windings 27 from contact with well fluid within central cavity 34.

Diffusers 35 are mounted in stator central cavity 34 for non-rotation. In this embodiment, only three diffusers 35 are shown. In practice, many more would be used. Each diffuser 35 is identical and may be made from a nonmagnetic material, such as a nickel alloy. Each diffuser 35 has a cylindrical exterior surface 37 that fits closely within stator wall 33. A diffuser seal 39 seals diffuser exterior surface 37 to stator wall 33. Each diffuser 35 has conventional diffuser passages 41 that lead from an intake area to an outlet area on the upper side. The diffuser passages 41 shown are of a mixed flow type that lead upward and inward. However, diffusers 35 could alternately be a radial flow type with passages 41 that lead primarily inward from the intake area to the outlet area.

In the embodiment shown, each diffuser 35 has a thin, lower end wall 43 that is cylindrical and abuts a similar thin, upper end wall 45 of the next upward diffuser 35. Upward and downward thrust imposed on diffusers 35 passes axially between end walls 43, 45. Alternately, diffusers 35 could be axially spaced apart from each other and connected to each other for thrust transmission by short, non-rotating shafts (not shown) on axis 15. Structure (not shown) at the upper and lower ends of housing 13 transfers thrust from diffusers 35 to housing 13.

A rotatable impeller 47 mounts between each diffuser 35. Each impeller 47 can be made from a magnetic material, such as a type of a stainless steel. Alternately, they could be formed of a nonmagnetic material, such as a nickel alloy. Each impeller 47 has vanes 49 that spiral and extend from a central or common inlet 48 upward and outward to a discharge area on the upper periphery. The body of impeller 47 includes a curved outer wall 51 that joins vanes 49 on their outer edges. The body of impeller 47 also includes a curved inner wall 53 that joins the inner edges of vanes 49. Outer wall 51 and inner wall 53 extend circumferentially around axis 15. Vane passages 55 are defined between adjacent vanes 49 and between outer and inner walls 51, 53. Outer wall 51 closes the outer sides of vanes passages 55 except at their inlets and outlets. Each vane passage 55 receives fluid from central inlet 48 and has a separate discharge on the upper end.

An array of permanent magnets 57 is mounted to and extends circumferentially around each impeller 47. Magnets 57 are not located in impeller passages 55 or on impeller vanes 49. Rather, the array of magnets 57 is at a different radial distance from axis 15 than impeller passages 55 and impeller vanes 49. In this example, the array of magnets 57 is radially farther from axis 15 than impeller passages 55. In this example, each magnet 57 is bonded into a pocket 58 formed on the lower side of impeller outer wall 51. A thin, retaining wall 59 surrounds the array of magnets 57, separating magnets 57 from the inner surfaces of diffuser end walls 43, 45. Retaining wall 59 may be integral with the body of impeller 47 or a separate component attached to the body of impeller 47.

Figure 3:
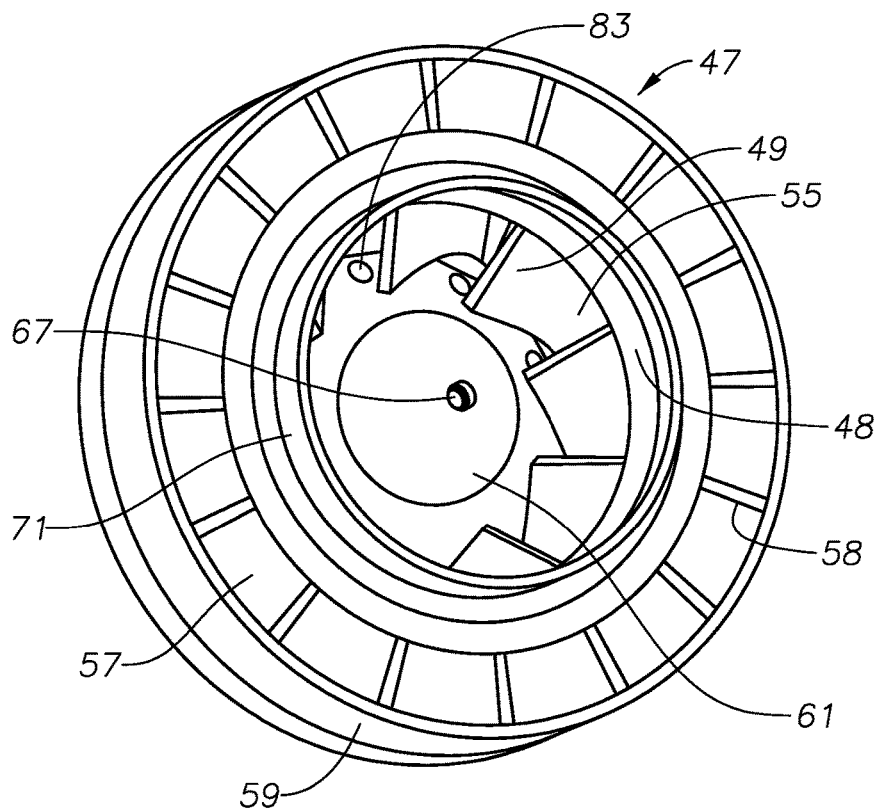
FIG. 3 is a perspective view from the intake side of one of the impellers of the pump and motor of FIG. 1.

In this example, the upper ends of magnets 57 are at an elevation below the outlets of impeller passages 55. The lower ends of magnets 57 are shown above the lower end of impeller inlet 48. Magnets 58 thus may be shorter in axial length or dimension than the axial distance from inlet 48 of impeller 47 to the outlets of impeller passages 55. As shown in FIG. 3, magnets 57 are circumferentially spaced apart from each other.

Alternately, magnets 57 could have lengths much greater than the axial distance from inlet 48 of impeller 47 to the outlets of impeller passages 55. For example, if diffuser upper and lower end walls 45, 43 of adjacent diffusers 35 were axially separated from each other rather than abutting, magnets 57 with much longer lengths could be mounted to the outer wall of impeller 47 in the axial space between diffusers 35. If so, the electromagnetic fields would not have to pass through abutting end walls 43, 45. Also, in that instance, thrust could be transferred between diffusers 35 by axial, nonrotating shafts.

Stator discs 19 are arranged to be radially outward from magnets 57 but not from diffusers 35. The axial length of each section of stator discs 19 is equal or greater than the axial length of magnets 57 so as to place magnets 57 in the electromagnetic fields. In this example, the lower end of each section of stator discs 19 is shown slightly above the lower ends of magnets 57 of one of the impellers 47, but they could be equal. The upper end of each section of stator discs 19 is shown to be slightly above the upper ends of magnets 57 of one of the impellers 47, but they could be equal.

Each section of spacer discs 21 is positioned to be radially outward from a large portion of the axial dimension of one of the diffusers 35, but not from magnets 57. Because the axial dimension of each diffuser 35 is greater than the axial dimension of magnets 57 in this embodiment, the axial length of each section of spacer discs 21 is greater than the axial length of each section of stator discs 19. The outer sides of magnets 57 are spaced radially from stator cavity wall 33 by an air gap plus the thickness of diffuser end walls 43, 45 in this embodiment.

As another alternative, magnets 57 could be mounted to impeller 47 in a circular array radially inward from impeller passages 55. In that instance, stator 17 would be mounted radially inward from the magnets 58 in a cylindrical column on the axis. Each impeller 57 would thus surround stator 17 and have a central opening through which stator 17 passes.

Referring again to FIG. 1, in this embodiment, each impeller 47 has a nose 61 that rotates with impeller 47 and may be integrally formed with it. Nose 61 is downward facing and conical. The apex of nose 61 may be spaced a short distance above impeller inlet 48, as shown. Each impeller 47 also has a cylindrical hub 63 on its upper end, which may be integrally formed with it. Hub 63 extends into a cylindrical chamber 65 of the next upward diffuser 35. Hub 63 rotates with impeller 47, thus is in sliding engagement with the inward facing wall of chamber 65. Chamber 65 is closed on its upper end.

A nose passage 67 may be located in the apex of nose 61 on axis 15. Nose passage 67 extends axially into hub 63, which is hollow. Nose passage 67 may have a set of helical grooves 69 formed therein to create a swirling action. Nose passage 67 diverts to chamber 65 a portion of the well fluid flowing into impeller inlet 48. Some outward leakage of the fluid from chamber 65 occurs between the interface of hub 63 and the inner wall of chamber 65.

Each impeller 47 has a skirt 71, which is a cylindrical, coaxial wall on its lower end. The inner diameter of skirt 71 defines impeller inlet 48. The outer diameter of skirt 71 fits within a diffuser skirt wall 73 on the upper side of the next lower diffuser 35. Skirt 71 closely slides in rotational engagement with diffuser skirt wall 73. A down thrust washer 75 may be located between a lower portion of impeller 47 outside of skirt 71 for engaging a mating surface on the next lower diffuser 35.

A cylindrical balance ring 77 protrudes from an upper side of each impeller 47. The next upward diffuser 35 has a cylindrical balance ring wall 79 depending downward. Balance ring wall 79 defines an annular balance ring cavity 81 on a lower side of diffuser 35. Balance ring 77 closely slides in rotational engagement with the inner side of balance ring wall 79 of the next upward diffuser 35. A balance hole 83 leads from each impeller passage 55 upward to balance ring cavity 81 of the next upward diffuser 35. Balance holes 83 divert a portion of the upward flowing well fluid in impeller passages 55 to balance ring cavity 81. Some leakage of fluid in balance ring cavity 81 between balance ring 77 and balance ring wall 79 occurs, causing well fluid in balance ring cavity 81 to bleed back into the well fluid being discharged through impeller passages 55. The leakage of fluid from diffuser chamber 65 flows into balance ring cavity 81.

An upward thrust washer 84 may surround hub 63 for engaging a downward facing surface in the next upward diffuser 35. Thrust washer 84 transfers any up thrust imposed on impeller 47 to the next upward diffuser 35. Balance holes 83 reduce the extent of up thrust.

A nonrotating intake member 85 is illustrated on the lower side of the lowest impeller 47. Intake member 85 has features similar to the upper end portions of diffusers 35. The lowest impeller 47 slides within a receptacle in intake member 85 in the same manner as diffusers 35. Intake member 85 has a thin, upper outer wall 86 in abutment with the lower end wall 43 of the next upward diffuser 35. Down thrust on diffusers 35 passes to intake member 85 and from there through structure (not shown) to housing 13.

Figure 4:
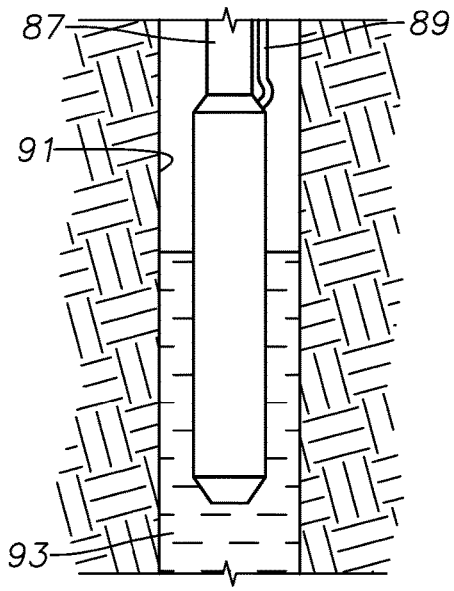
FIG. 4 is a schematic view of the pump and motor of FIG. 1 installed within a well.

Referring to FIG. 4, in use, combined pump and motor 11 may be secured to a string of production tubing 87 extending to a wellhead assembly (not shown) at the surface. A power cable 89 extends downward from the wellhead alongside production tubing 87 to combined pump and motor 11 for supplying AC three phase power. Production tubing 87 supports pump and motor 11 within a casing 91 containing a well fluid 93. Other installation arrangements may be employed, such as supporting combined pump and motor 11 on coiled tubing that contains power cable 89. In that instance, the discharge of combined pump and motor 11 would be into casing 91 or a liner within casing 91. Pump and motor 11 may be suspended above or below perforations (not shown) in casing 91.

In operation, AC three-phase electrical power supplied to windings 27 (FIG. 2) creates electromagnetic fields into stator cavity 34. The electromagnetic fields affect magnets 57 to cause impellers 47 to rotate. Well fluid 93 (FIG. 4) flows through intake member 85 into impeller inlet 48 of the lowest impeller 47. Impeller 47 discharges the well fluid from impeller passages 55 into diffuser passages 41 of the next upward diffuser 35. Each stage of impeller 47 and diffuser 35 increases the pressure of the well fluid in the same manner as a centrifugal pump.

The present disclosure described herein, therefore, is well adapted to carry out the objects and attain the ends and advantages mentioned, as well as others inherent therein. The combined pump and motor has a shorter length than a prior art ESP with the same number of pump stages. The combined pump and motor has fewer components than a prior art ESP. A rotating shaft is not needed, eliminating a well fluid leakage path through a shaft seal. A pressure equalizer is not needed. Cooling occurs due to the well fluid flowing up the interior of the combined pump and motor. If the combined pump and motor is suspended above the perforations, cooling fluid along the exterior of the motor may not be needed. If the combined pump and motor is suspended below the perforations, the well fluid flowing downward past the housing to the intake at the lower end of the combined pump and motor also provides cooling. There are other advantages, as well.

While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. A combined pump and motor apparatus, comprising:
a housing having an axis, an upstream end and a downstream end;
a plurality of diffusers mounted for non-rotation in the housing, each of the diffusers having diffuser passages;
an impeller rotatably mounted between each of the diffusers, each of the impellers having impeller vanes defining impeller passages between adjacent ones of the impeller vanes, the impeller having an exterior outer wall extending circumferentially around the impeller vanes, closing outer sides of each of the impeller passages;
a plurality of magnets mounted to each of the impellers, the magnets being spaced circumferentially apart from each other around the axis at a different radial distance from the axis than the impeller vanes;
a stator non rotatably mounted in the housing, the stator having a plurality of windings for interacting with the magnets to impart rotation to the impellers; the stator comprising:
a plurality of stator discs of a magnetic steel alloy, the stator discs being grouped in stator sections, each of the stator sections being radially spaced from the magnets of one of the impellers;
a plurality of spacer members, the spacer members being axially positioned between each of the stator sections and radially spaced from the diffusers, the spacer members being formed of a nonmagnetic material; and
each of the stator discs and each of the spacer members having a central aperture, the central apertures having a same inner diameter, defining a central cavity containing the diffusers and the impellers, the central cavity having a constant inner diameter through the stator, the constant inner diameter being larger than maximum outer diameters of the diffusers and the impellers.

2. The apparatus according to claim 1, wherein:
each of the impellers has an upstream end with a cylindrical skirt and a downstream end with a cylindrical balance ring;
each of the diffusers has a downstream end with a cylindrical skirt wall that is slidingly engaged by the skirt of a downstream one of the impellers; and
each of the diffusers has an upstream end with a cylindrical balance ring wall that is slidingly engaged by the balance ring of an upstream one of the impellers.

3. The apparatus according to claim 1, wherein:
each of the impellers has an upstream end with a cylindrical skirt and a downstream end with a cylindrical balance ring;
each of the diffusers has a downstream end with a cylindrical skirt wall that is slidingly engaged by the skirt of a downstream one of the impellers;
each of the diffusers has a balance ring cavity bounded by a cylindrical balance ring wall that is slidingly engaged by the balance ring of an upstream one of the impellers; and
a balance hole extends through each of the impeller passages to the balance ring cavity to divert a portion of the fluid flowing through the impeller passages to the balance ring cavity.

4. The apparatus according to claim 1, wherein:
an axial distance between adjacent ones of the spacer sections is greater than an axial length of each of the spacer sections.

5. The apparatus according to claim 1, wherein each of the spacer members comprises:
a plurality of spacer discs stacked together in spacer disc sections.

6. The apparatus according to claim 1, wherein the apparatus further comprises:
a diffuser outer seal that seals between the exterior of each of the diffusers and the cylindrical wall of the stator cavity.

7. The apparatus according to claim 1, further comprising:
a nonmagnetic sleeve installed within the central apertures of the stator discs and the spacer members; and
wherein the cylindrical wall of the stator cavity comprises the nonmagnetic sleeve.

8. The apparatus according to claim 1, further comprising:
a cylindrical exterior wall on each of the impellers surrounding outer sides of the magnets of each of the impellers.

9. The apparatus according to claim 1, wherein each of the magnets has an axial dimension that differs from an axial dimension of each of the impeller passages.

10. The apparatus according to claim 1, further comprising:
a conical nose on each of the impellers concentric with the axis, each of the noses rotating with one of the impellers and facing in an upstream direction.

11. A combined pump and motor apparatus, comprising:
a housing having a longitudinal axis;
a plurality of stator discs stationarily mounted in the housing, each of the stator discs having a plurality of stator disc slots spaced around a coaxial stator disc central aperture, the central apertures of the stator discs defining a cylindrical central cavity of a stator;
windings extending through the stator disc slots;
a plurality of diffusers in the central cavity, the diffusers having cylindrical exterior surfaces that are sealed to a wall defining the central cavity;
a plurality of impellers, each of the impellers being located between adjacent ones of the diffusers, each of the impellers having impeller vanes that define impeller passages between adjacent ones of the impeller vanes, each of the impellers having an outer wall that encloses outer sides of each of the impeller passages;
an array of magnets mounted circumferentially to each of the impellers, each of the arrays being a greater distance from the axis than the impeller passages and interacting with the stator to cause each of the impellers to rotate;
the stator discs being formed of a magnetic material steel alloy and stacked in stator disc sections, each of the stator disc sections being radially outward from the array of magnets of one of the impellers;

a plurality of spacer discs formed of a non-magnetic alloy and stacked in spacer disc sections, each of the spacer discs having a plurality of spacer disc slots spaced around a coaxial spacer disc central aperture, the windings extending through which the spacer disc slots, the spacer disc sections being positioned axially between each of the stator disc sections and radially outward from the diffusers; and the central apertures of the spacer discs having a same inner diameter as the central apertures of the stator discs, defining a constant outer diameter of the central cavity from an upstream end to a downstream end of the stator.

12. The apparatus according to claim 11, wherein:

no portion of any of the diffusers has an outer diameter greater than the inner diameter of the stator disc central apertures and the spacer disc central apertures.

13. The apparatus according to claim 11, wherein:

the spacer disc sections have a greater axial length than the stator disc sections.

14. The apparatus according to claim 11, further comprising:

a nonmagnetic sleeve sealed to the central apertures of the stator discs and the spacer discs, the nonmagnetic sleeve defining the outer diameter of the central cavity.

15. The apparatus according to claim 11, further comprising a cylindrical retaining wall extending around each of the impellers on an outer side of the array of magnets.

16. A combined pump and motor apparatus, comprising:

a housing having a longitudinal axis, an upstream end and a downstream end;

a stack of stator discs stationarily mounted in the housing, each of the discs having a plurality of slots spaced around a coaxial central aperture, the central apertures defining a stator cavity with an inward facing cylindrical stator wall having a constant diameter from the upstream end to the downstream end of the housing;

windings extending through the slots;

a plurality of diffusers in the stator cavity, the diffusers having cylindrical exterior surfaces, each of the diffusers having an upstream end that abuts a downstream end of an adjacent one of the diffusers;

diffuser seals that seal the exteriors of the diffusers to the stator wall;

a plurality of impellers, each of the impellers being located between adjacent ones of the diffusers, each of the impellers having impeller vanes that define impeller passages between adjacent ones of the impeller vanes, each of the impellers having an outer wall that encloses outer sides of each of the impeller passages;

an array of magnets mounted circumferentially to each of the impellers, each of the arrays being a greater distance from the axis than the impeller passages and interacting with the stator to cause each of the impellers to rotate;

each of the impellers having an upstream facing conical nose that rotates in unison and has an apex centered on the axis, the nose directing downstream flowing fluid into the impeller passages; wherein:

each of the diffusers has a central chamber that is coaxial, has an open upstream end and a closed downstream end;

each of the impellers has a cylindrical hub that extends into the chamber of one of the diffusers in sliding rotational engagement with a wall of the chamber; and a nose passage extends axially through the apex of each nose into the hub for diverting a portion of the downstream flowing fluid into the chamber.

17. The apparatus according to claim 16, further comprising a helical groove in the nose passage.

18. The apparatus according to claim 16, wherein each of the impellers further comprises:

a cylindrical retaining wall encircling the array of magnets.

19. The apparatus according to claim 16, further comprising:

a nonmagnetic sleeve within the central apertures of the stator discs; and wherein the cylindrical stator wall comprises the nonmagnetic sleeve.

* * * * *

UNITED STATES PATENT AND TRADEMARK OFFICE
CERTIFICATE OF CORRECTION

Page 1 of 1

PATENT NO.          : 10,830,241 B2
APPLICATION NO.     : 15/954719
DATED               : November 10, 2020
INVENTOR(S)         : Ye et al.

It is certified that error appears in the above-identified patent and that said Letters Patent is hereby corrected as shown below:

In the Specification

Column 4, Line 1, reads:
"apertures 27 at the top and bottom of stator 17 to prevent"
It should read:
--apertures 25 at the top and bottom of stator 17 to prevent--;

Column 4, Line 4, reads:
"optionally be disposed in in slots 23 to seal windings 27"
It should read:
--optionally be disposed in slots 23 to seal windings 27--; and Column 4, Line 43, reads:
"Outer wall 51 closes the outer sides of vanes passages 55"
It should read:
--Outer wall 51 closes the outer sides of vane passages 55--.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*